(12) United States Patent
Ezequiel

(10) Patent No.: US 10,721,542 B2
(45) Date of Patent: Jul. 21, 2020

(54) METHOD AND DEVICE FOR PROVIDING A MAIN CONTENT AND AN EXTRA CONTENT TO A USER THROUGH REFERENCE ITEM

(75) Inventor: Ruiz Rodriguez Ezequiel, Panama (PA)

(73) Assignee: Naxos Finance SA, Luxembourg (LU)

( * ) Notice: Subject to any disclaimer, the term of this patent is extended or adjusted under 35 U.S.C. 154(b) by 0 days.

(21) Appl. No.: 14/396,843

(22) PCT Filed: Apr. 26, 2012

(86) PCT No.: PCT/EP2012/057644
§ 371 (c)(1),
(2), (4) Date: Dec. 4, 2014

(87) PCT Pub. No.: WO2013/159817
PCT Pub. Date: Oct. 31, 2013

(65) Prior Publication Data
US 2015/0128169 A1    May 7, 2015

(51) Int. Cl.
*H04N 21/81* (2011.01)
*H04N 5/445* (2011.01)
(Continued)

(52) U.S. Cl.
CPC ..... *H04N 21/8133* (2013.01); *H04N 5/44543* (2013.01); *H04N 5/44591* (2013.01);
(Continued)

(58) Field of Classification Search
CPC ........... H04N 21/4722; H04N 21/2187; H04N 21/234345; H04N 21/4223;
(Continued)

(56) References Cited

U.S. PATENT DOCUMENTS

| 5,684,525 A | 11/1997 | Klosterman |
| 6,349,410 B1 * | 2/2002 | Lortz ................ H04N 5/76 |
| | | 375/E7.021 |

(Continued)

FOREIGN PATENT DOCUMENTS

| CN | 1185257 A | 6/1998 |
| CN | 1352765 A | 6/2002 |

(Continued)

OTHER PUBLICATIONS

International Search Report for Application No. PCT/EP2012/057644 dated Dec. 12, 2012.
(Continued)

*Primary Examiner* — Yassin Alata
(74) *Attorney, Agent, or Firm* — Workman Nydegger

(57) ABSTRACT

A method for providing a main content and an extra content to a user by accessing said extra content through a reference item. The method includes receiving said main content from a first source and displaying said main content by said first device. Also, based on said reference item, said extra content is retrieved and/or received from a second source and simultaneously displayed together with said main content on said first device. Or said reference item may be forwarded to a second device, and thereby said extra content is retrieved and/or received from a second source by said second device and, simultaneously, the main content is displayed on said first device and the extra content is displayed on said second device.

14 Claims, 3 Drawing Sheets

(51) Int. Cl.
*H04N 21/41* (2011.01)
*H04N 21/422* (2011.01)
*H04N 21/431* (2011.01)
*H04N 21/462* (2011.01)
*H04N 21/858* (2011.01)
*H04N 21/436* (2011.01)
*H04N 21/4725* (2011.01)
*H04N 5/44* (2011.01)

(52) U.S. Cl.
CPC ... *H04N 21/4126* (2013.01); *H04N 21/42209* (2013.01); *H04N 21/4316* (2013.01); *H04N 21/43615* (2013.01); *H04N 21/4622* (2013.01); *H04N 21/4725* (2013.01); *H04N 21/8586* (2013.01); *H04N 2005/441* (2013.01)

(58) Field of Classification Search
CPC .......... H04N 21/4307; H04N 21/4316; H04N 21/4622; H04N 21/4725; H04N 21/616; H04N 21/8547
USPC ...................................... 725/32–36
See application file for complete search history.

(56) References Cited

U.S. PATENT DOCUMENTS

| | | | |
|---|---|---|---|
| 6,448,979 | B1 | 9/2002 | Schena et al. |
| 8,752,758 | B1* | 6/2014 | Klebe .................. 235/375 |
| 2009/0295998 | A1* | 12/2009 | Nobori et al. ............ 348/565 |
| 2009/0307721 | A1* | 12/2009 | Afram ................ H04N 5/44543 725/34 |
| 2011/0219419 | A1 | 9/2011 | Reisman |
| 2011/0231872 | A1* | 9/2011 | Gharachorloo et al. ........ 725/28 |
| 2012/0222071 | A1* | 8/2012 | Gaede .................... H04N 5/765 725/38 |

FOREIGN PATENT DOCUMENTS

| | | |
|---|---|---|
| EP | 2 129 110 | 12/2009 |
| EP | 2 271 100 A1 | 1/2011 |
| KR | 10-2009-0124994 | 12/2009 |

OTHER PUBLICATIONS

XP-002677649—Database Compendex (online) Engineering Information, Inc., 2008, Mas I et al: "IPTV session mobility" (XP-002677649), Database accession No. E20090111839615 abstract & 3rd International Conference on Communications and Networking in China. Chinacom 2008—3rd International Conference on Communications and Networking in China. Chinacom 2008. 2008, Inst. of Elec. and Elec. Eng. Computer Society US. 2008. pp. 902-908 DOI: DOI:10.1109/Chinacom.2008.4685170.
Korean Office Action dated Oct. 22, 2015 for Application No. 10-2014-7032883.
Chinese Office Action dated Jan. 25, 2017, issued in CN Application No. 201280072715.7.
Office Action dated Aug. 25, 2017, in Chinese Application No. 201280072715.7 (English translation).

* cited by examiner

METHOD AND DEVICE FOR PROVIDING A MAIN CONTENT AND AN EXTRA CONTENT TO A USER THROUGH REFERENCE ITEM

The present application claims priority from PCT Patent Application No. PCT/EP2012/057644 filed on Apr. 26, 2012, the disclosure of which is incorporated herein by reference in its entirety.

FIELD OF THE INVENTION

It is noted that citation or identification of any document in this application is not an admission that such document is available as prior art to the present invention.

The present invention relates to methods and devices for providing a main content and an extra content to a user by accessing the extra content through a reference item and by displaying the main content and the extra content. The present invention relates in particular to Smart TVs; TVs, PCs, note books, tablet PCs and other similar devices which are capable to receive and display audio and video contents and, in addition, to retrieve and display additional contents or data as an extra content. The extra content is retrieved, by linking a reference item which leads to a source that provides the extra content.

It is known that common broadcasted contents which are broadcasted over air, extra-terrestrial equipment, networks, internet or cable television contain additional information or references (hereinafter referred to as reference item) which can be tracked by the user and can be displayed on the same device. The reference items are provided as a subtitle, metadata, teletext or the like. The reference items are broadcasted together with the broadcasted main content and the current systems have the disadvantage to force in practice the user to leave the main content for tracking the reference item and get access to an extra content. Extra content means any kind of additional information or data related to the main audio video content, aiming at deepening the subject of the main content and providing additional information to the user. The term extra content is also used for other kinds of additional information not directly related to the subject of the main content, such as advertisement.

Another disadvantage of the current systems relies in the limitation to use the same device used to reproduce the main content also for reproducing the extra content. An interaction of the latter device with another device is not possible or very limited. The aforementioned drawback is particularly evident when the main content and the extra content have different sources, for example when the main content is broadcasted by a TV broadcaster and the extra content is stored on a server and is accessible over an interact connection. Hence a user willing to display an extra content is forced to leave the main broadcasted content in order to retrieve and display the extra content. Consequently, current systems limit the user to impractical interactions. In other words the user is limited to choose between the main content and the extra content. This implies that the user does not dispose on the option to be re-directed to the extra content from a different source while keeping the main content simultaneously available and displayed to the user.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, fast paragraph), such that applicant(s) reserve the right to disclaim, and hereby disclose a disclaimer of, any previously described product, method of making the product, or process of using the product.

SUMMARY OF THE INVENTION

It would therefore be desirable to provide a main content and an extra content to the user by accessing the extra content through a reference item, while enabling the user to simultaneously display both. In addition, it would be generally desirable to update the extra content in accordance to a change of the main content.

The present invention addresses the above mentioned needs through a method according to a first aspect of the present invention, providing a main content and an extra content to a user by accessing said extra content through a reference item. Said method is characterized by first step in which said main content is received from a first source and displayed by said first device. In a second step the reference item is redirecting to said extra content originated from a second source. In a third step the extra content is displayed simultaneously to said main content on said first device or alternatively said reference item is forwarded to a second device and thereby said extra content is retrieved from a second source and is reproduced on said second device simultaneously to said main cont on said first device. Generally the extra content is changed in correspondence to a change of said main content.

In accordance with the previous explanations, the main content is broadcasted over a first source by a service provider, television broadcaster, internet provider or any kind of source which is foreseen to transmit multimedia contents consisting of audio visual information. The main content is for example represented by a television programme, internet TV programme or multimedia content. The aforementioned contents can be provided over a set-top box which is supported by a specific provider. The main content is received from the first source and is displayed on a first device. The aforementioned first device refers to devices such as TVs, Smart TVs, note books, PCs, tablet PCs, smart phones or the like which are capable of receiving the above-mentioned main contents or any other type of known data types or formats processable or displayable by electronic devices. At the reception of any kind of reference items, the method according to the present invention includes two options to process and display said extra content. The first option is retrieving said extra content from a second source over the linked reference item. The second source is characterized by being different from the first source. The first source and the second source are distinguishable by broadcaster, system provider, location of the server, type of content retrieved or by the interface used to access and retrieve contents. According to the aforementioned first option, generally extra content and main content are simultaneously displayed on the first device. The simultaneous displaying of main content and extra content includes different positioning of both contents on different areas of the display of the first device, overlapping of both contents in which each of the displayed contents has a different rate of transparency or by portioned displaying of the main content and the extra content on the display of the first device comparable to a picture in picture presentation. According to the second option the reference item is forwarded to a second device which can be one of the aforementioned types. The different types of the second device are also covered by the scope of the term of the first device. In this case the extra content originated from a second source is received by the second device and the extra content is displayed on the second device and not on the first device. In this context the first device forwards the reference item to at least one second device. The user can track the main content on the first device and deepen the main content by using a second device while accessing the extra content on the latter. Generally the extra content is changing in correspondence with a change of the main content. This step keeps the extra content always updated according to the main content. The interaction of the user is made comfortable and simple by updating and providing automatically an extra content which is related to the main content. It is clear that in both the previous cases, because the contents are changing continuously, the extra content must be correlated to the main content, even if the extra content changes less rapidly than the main content. In fact, if the main content is, for instance, related to a movie, the extra content will change in relationship to the change of the various scenes. For doing so it is necessary to link the main content and the extra content.

In a preferred embodiment of the present invention, when the extra content feature is selected, this one does not change any more even if the main content is changing and new extra content should be displayed in correlation to the changed main content. This allows the user to finish reviewing the extra-content even if the main content has already changed. When the user wants to see the next extra content, that in the meantime is correlated to the new main content, a confirmation and/or an input by the user is required for changing the extra-content and making it correlated with the new main content. For doing this a specific command key or a dedicated icon should be provided in the control means of the first or second device, as well as a memory where the reference items are stored. Through this memory is also possible to scroll the reference items that are already flowed before arriving to the one related to present new displayed main content. For making this feature available, it is necessary to have also a memory of the reference items flowed in recent time on the site of the source of the reference items. Of course a specific command key or dedicated icon should be provided for freezing the flow of the reference items, instead of freezing them automatically when the extra content is selected, In any case also command key or dedicated icon for allowing the new items to be viewed again in accordance with the present main content or to scroll the past ones, should be provided, In another embodiment, the method is using a reference item which contains at least a metadata, and URL, an encrypted data, a hyperlink, a QR-code, a bar code, machine-readable data or optical machine-readable data. The reference item according to one of the aforementioned types is then processed by the first device, redirecting the first device to an extra content and enabling said first device to receive and reproduce it. Alternatively said extra content is forwarded to the second device, which can then be redirected to the extra content and can then receive and reproduce it. The forwarding of the reference item includes the options of transmitting the reference data over a wired or wireless connection to the second device.

In a further embodiment, the reference item is provided to the second device by scanning the reference item displayed on the first device via said second device. Such reference item will then be processed according to the explanation above The latter possibility is particularly advantageous when using existing visual codes systems, such as QR-codes, bar codes or optical machine-readable data.

In a third aspect of the invention the reference item is available on the first device. The availability of the reference item on the first device involves for example the storing of the reference item as a primary reference item on the first device which is provided while producing (factory setting) the first device or retrieved by the first usage of the first device. This means that the primary reference item can be pre installed on the first device. The primary reference item can be related to a specific broadcaster or network and can lead to a source and/or service supported by the broadcaster or network to retrieve further reference items or extra contents.

In another embodiment the extra content is related to the main content. In this case the extra content is contextually related to the main content so that by accessing the extra content the user will receive additional content depending on the main content. This advantageous option can be used from a broadcaster to provide content deepening information to the user. In other cases, while the extra content is not related to the main content, the provided reference items from the broadcaster are pointing to extra contents such as advertisements, additional information like in teletext or other information that is of economic interest for the broadcaster.

In another aspect of the invention the first device is providing a look-up table containing identifiers of said First sources and containing the reference items corresponding to said first sources. This advantageous embodiment creates a look-up table which is correlating the identifiers according to the first source (these can be for example the name of a specific broadcaster) with the corresponding reference item which is related to the specific broadcaster or network. The look-up table consists mainly of a list that contains the identifiers of the first source (names of the broadcasters or networks) and the corresponding reference items. The listing and/or displaying of the corresponding reference items is not essential and can be kept in the background with the result that the user can just select the identifier of a specific broadcaster or network to retrieve the related extra content. The assignment of the reference items to the corresponding sources can also be done automatically by the device, if the device having to display the extra content is programmed accordingly. The look-up table is to facilitate the access of the user to extra contents so that the extra content can be received and displayed to the user even regardless of the actual main content watched by the user. Also in this embodiment the reference item can be forwarded to a second device for accessing the extra content on said second device. It is clear that this look-up table can have as many reference items as many broadcasters or networks are programmed.

In an additional aspect of the invention the look-up table is retrieved by tracking a look-up table path stored on the first device. This advantageous embodiment allows for a path to be embedded in the first device during the production phase, at the factory premises. A stored path for the look-up table can be accessed while using the first device for the first time or can be accessed and/or be updated in specific periods of time. The look-up table path leads to a source to retrieve the look-up table so that the look-up table is transmitted to the first device.

In a preferred embodiment the first source is a first network or a first data base and the second source is a second network or a second data base.

In another preferred embodiment the first device is a TV or a projector and said second device is a tablet PC, Smartphone, cellular phone, PC, laptop or a remote control. The advantageous effects of the aforementioned embodiment for usage as a first device and/or the second device are self-explanatory. The second device could be also a remote control. The use of displays on remote controls is known to the person skilled in the arts and the combination of the present invention with more advanced remote controls can be used to enhance the interactive use of devices that provide contents to the users.

In an aspect said remote control comprises an actuating element to initiate said tracking of the reference item on said first device. According to the aforementioned embodiment of the present invention, the remote control includes a specific activating element such as button, touch pad field or a sensing area. The actuating element has preferably an easily identifiable shape, colour, position or a symbol on the remote control.

In an additional aspect of the present invention the first device and said second device are paired over a network. According to this advantageous embodiment the first device and the second device are communicating with each other over a network and can exchange data. This enables the user to have a more interactive use of the devices by enhancing the communication between the devices.

According to a preferred embodiment the aforementioned network is wireless LAN network (WLAN), high speed mobile network, internet, Bluetooth network or a Near Field Chip (NFC) network.

In another embodiment of the present invention said forwarding of said reference item is executed by scanning said reference item by means of said second device. The reference item provided by the first device can be scanned by the second device and be processed further to access an extra content.

According to the advantageous aspects of the present invention, a device for performing one of the methods of the present invention is claimed. This covers the usage of TVs, Smart TVs, note books, PCs, tablet PCs, smart phones or the like as the first device and/or second device.

An advantageous embodiment of the invention is carried out by providing extra content to the user while facilitating the change of the main content which is currently displayed to the user. The foregoing embodiment enables the user to jump/zap to other interesting main contents while displaying the same/previous extra content. In this case the synchronization between the main content and the extra content must be suspended for a while, for instance, until the main content remains relating to the same broadcaster or network for a while (few seconds), meaning that the zapping is ended and/or by an input or a confirmation by the user.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
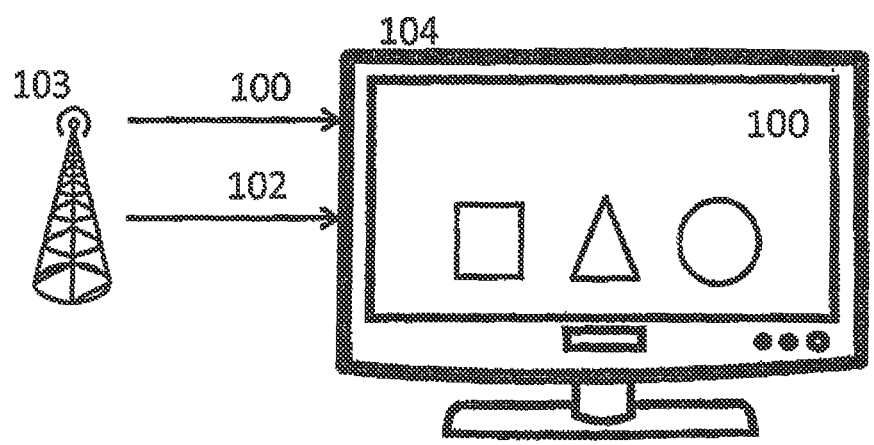
FIG. 1 is a front view of a first device 104 represented as a TV and a first source 103 represented as a broadcasting station in accordance with some embodiments of the invention.

FIG. 1 is a front view of a first device 104 represented as a TV and a first source 103 represented as a broadcasting station which is broadcasting a main content 100 and a reference item 102. The first source 103 can also be a different kind of broadcasting equipment, like an internet connection providing for instance IP TV. The first device 104 receives the main content 100 and the reference item 102 and displays the main content 100 on the display of the first device 104. The main content is symbolically depicted as a square, a triangle and a circle. The representation of the first source 103 by the broadcasting station does not mean that the realization of the first source 103 is just limited to a broadcasting station but rather to any kind of source which transmits a main content and/or a reference item. Further examples for the first source 103 that is symbolically depicted as the broadcasting station are electronic servers, data storage devices (hard drives, SSD, memory chips or the like) or storage media (Blue Ray discs, DVDs, CDs or the like), and interact such as multimedia data. The first device 104 is symbolically depicted as a TV, but this does not imply any kind of limitation to TVs while using a method according to any embodiments of the present invention.

Figure 2:
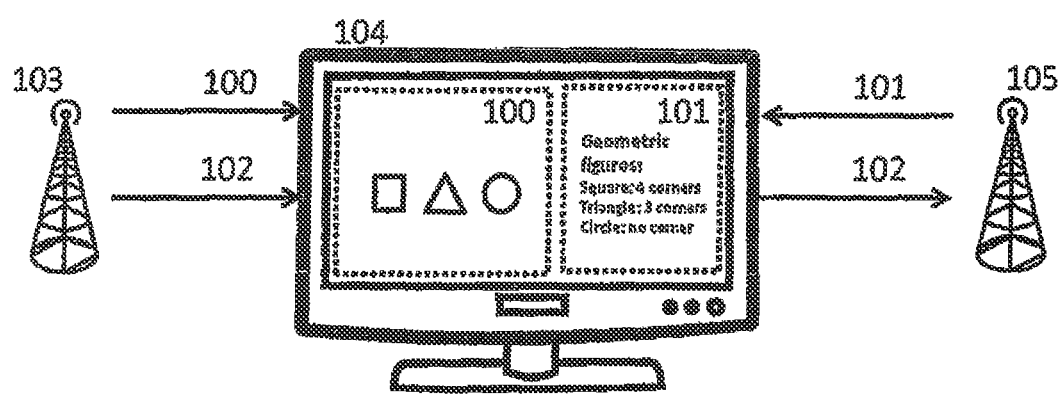
FIG. 2 is a front view of a first device 104 represented as a TV, a first source 103 and a second source 105 represented as broadcasting stations in accordance with some embodiments of the invention.

FIG. 2 is a front view of the first device 104 represented as a TV, the first source 103 represented as a broadcasting station and a second source 105 represented by a server transmitting information coming from a database. The first source 103 broadcasts a main content 100 and a reference item 102 to be received by the first device 104. The first device 104 tracks the reference item 102 which leads to the second source 105 that provides extra content 101. The extra content 101 provided by the second source 105 is transmitted to the first device 104. The main content 100 and the extra content 101 are displayed upon request by the user on different areas of the display of the first device 104. The extra content 101 is related to the main content 100 that consists of one square, one triangle and one circle. The extra content 101 is exemplary providing the number of corners of the geometric figures of the main content 100. It should be noted that the extra content 101 is not just limited to contents that are related to the main content.

Figure 3:
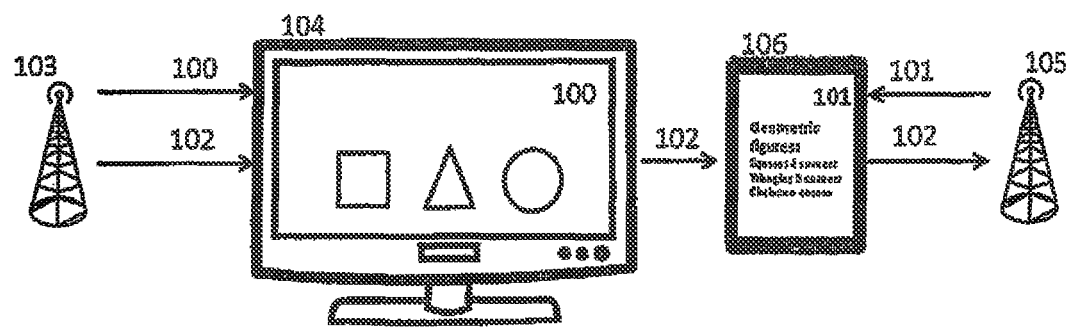
FIG. 3 is a front view of a first device 104 represented as a TV, a second device 106 represented as a tablet PC, a first source 103 and a second source 105 represented as broadcasting stations in accordance with some embodiments of the invention.

FIG. 3 is a front view of a first device 104 represented as a TV, a second device 106 represented as a tablet PC, a first source 103 represented as a broadcasting station and a second source 105 represented as a database. The first source 103 broadcasts a main content 100 and a reference item 102 which are received by the first device 104. The main content 100 is displayed on the first device 104 and the reference item 102 is forwarded to the second device 106. The second device 106 retrieves an extra content 101 based on the reference item 102 received by the first device 104. The extra content 101 is then displayed on the second device 106 and the main content 100 is simultaneously displayed on the first device 104. The main content 100 is representing geometric figures and the extra content 101 is representing the number of corners of the aforementioned geometric figures. According to the above-mentioned explanations and the descriptions of the previous figures, the first source 103 and the second source 105 are not limited to the broadcasting station or information coming from a database. For instance, the extra content can be retrieved through internet. In addition, the employment of the second device 106 is not limited to a tablet pc.

Figure 4:
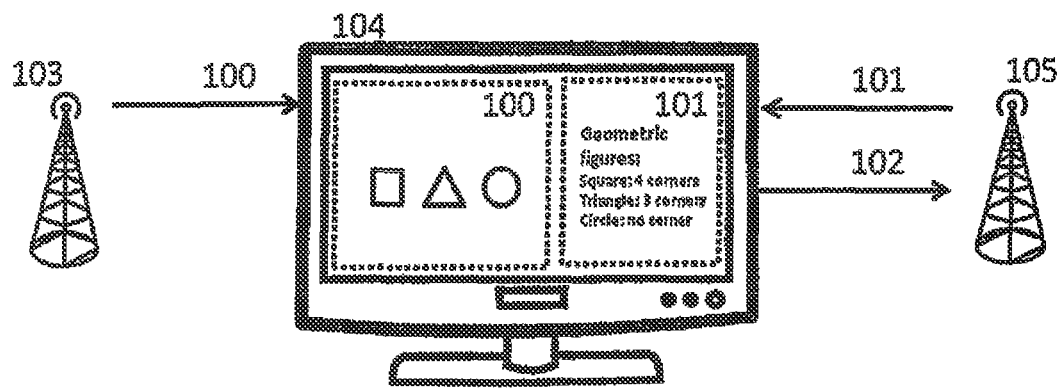
FIG. 4 is a front view of a first device 104 represented as a TV, a first source 103 and a second source 105 represented as broadcasting stations in accordance with some embodiments of the invention.

FIG. 4 is a front view of a first device 104 represented as a TV, a first source 103 represented as a broadcasting station and a second source 105 represented as information coming from a database. The first source 103 is broadcasting just a main content 100 that is received by the first device 104. A reference item 102 is retrieved by the first device 104 while following the indication contained in a primary reference item. Such primary reference item is containing the information to retrieve further reference items or extra contents. Such primary reference item is stored on the first device 104 while producing (factory setting) the first device 104 or retrieved during the first usage of the fast device 104. This means that the primary reference item can be pre installed on the first device. Based on the reference item 102, the first device 104 retrieves an extra content 101 from a second source 105 tracking said reference item 102. The first device 104 is simultaneously displaying on different areas of the display the main content 100 and the extra content 101. The main content 100 and the extra content 101 are represented as geometric figures and the number of corners of the aforementioned geometric figures.

To be clear, in the case of a primary reference item obtained through internet, the primary reference item can be the address of the broadcaster or network (for instance: www.zdf.de/ZDFmediathek/) and the reference item 102 can be the specific one related to the program presently seen (for instance: www.zdf.de/ZDFmediathek/Titanic—Folge-1)

Figure 5:
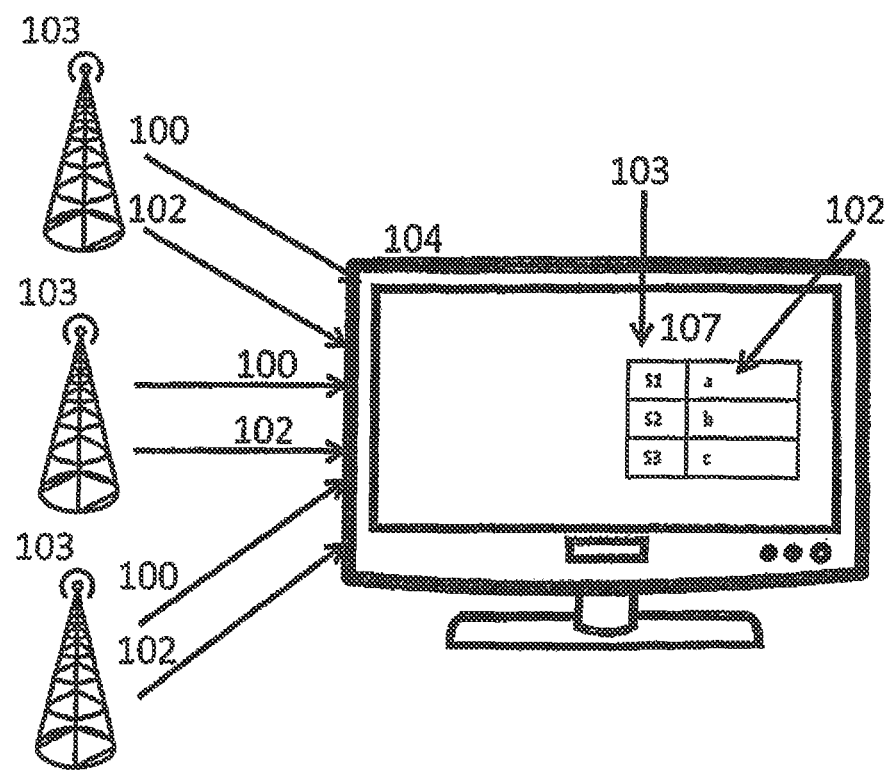
FIG. 5 is a front view of a first device 104 represented as a TV, three first sources 103 represented as broadcasting stations in accordance with some embodiments of the invention.

FIG. 5 is a front view of a first device 104 represented as a TV and three first sources 103 represented as three different broadcasting stations. The first device 104 receives from each of the first sources 103 a main content 100 and a reference item 102. The main contents 100 and the reference items 102 are processed by the first device 104 and are presented in a look-up table 107. The look-up table 107 consists of at least two columns. In a first column of the look-up table the names of the broadcasters or networks originated from each of the first sources 103 are listed and in a second column the corresponding reference items 102 are listed. Each row of the look-up table 107 is consisting of the name of a broadcaster or network and the reference item 102 corresponding to the aforementioned broadcaster. In this way the look-up table 107 gives an overview of the different sources 103 so that a user is able to track a reference item 102 which belongs to a specific broadcaster or network. The depicted look—up table 107 provides the name of the upper first source 103 as S1 and the reference item 102 of S1 as "a", the name of the middle first source 103 as S2 and the reference item 102 of S2 as "b" and the name of the bottom first source S3 and the reference item 102 of S3 as "c".

It is clear that in FIG. 5, as well as in other embodiments of the present invention, the reference item 102 could be substituted by the primary reference item.

Figure 6:
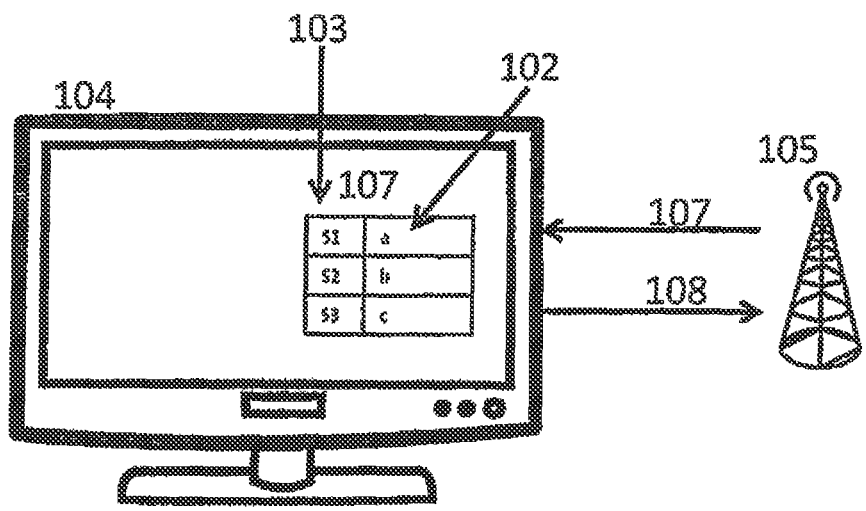
FIG. 6 is a front view of a first device 104 represented as a TV and a second source 105 represented as a broadcasting station in accordance with some embodiments of the invention.

FIG. 6 is a front view of a first device 104 represented as a TV and a second source 105 represented as information coming from a database. The first device 104 tracks a reference item 108 that leads to the second source 105 which is providing a look-up table 107. In this case the reference item 108 is provided by the first device 104 and not by a broadcaster as in FIG. 5. The content of the look-up table 107 is the same as in FIG. 5.

In another embodiment, the first device 104 or the second device 106 are programmed with a single fixed meta-reference-item, for example during the production phase, which can be accessed by the first device 104 or by the second device 106. At the landing location of such meta-reference-item, the producer of the first device 104 or the producer of the second device 106 or another entity is keeping updated records of primary reference items or of reference items. Such primary reference items or reference items can then be used by the first device 104 or by the second device 106 to retrieve and reproduce extra contents.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method for providing a main content and an extra content to a user, said method comprising:
    receiving a specific main content and metadata from a first source and displaying said specific main content on a first device, wherein said metadata and said specific main content are broadcasted together from the first source, and wherein said metadata links said specific main content with an extra content;
    forwarding said metadata to a second device, wherein:
        the forwarding of said metadata is executed by scanning said metadata by said second device,
        the second device receives said extra content from a second source, and
        said specific main content is displayed on said first device while said extra content is displayed on said second device;
    wherein the extra content changes in correspondence to a change of the specific main content;
    wherein the first source is different from the second source;

wherein, when the extra content is selected, the extra content does not change even if the specific main content is changing, and any new extra content, which correlates to the changing specific main content, is delayed from being displayed on the second device until such time as a confirmation or input is received at the second device from the first device, and wherein the confirmation or input is initially received at a command key of the first device, which is displaying the specific main content, such that the first device's command key, when selected, provides the confirmation or input and further causes the second device to display the new extra content.

2. The method according to claim 1, wherein the extra content changes only after the input or the confirmation is received.

3. The method according to claim 1, wherein the first device provides a look-up table containing identifiers of a plurality of first sources and corresponding plurality of metadata.

4. The method according to claim 3, wherein the look-up table is retrieved by tracking a look-up table path stored on said first device.

5. The method according to claim 1, wherein the first source is a first network or a first database, and wherein said second source is a second network or a second database.

6. The method according to claim 3, wherein the second device is a remote control, which comprises an actuating element to initiate said tracking.

7. The method according to claim 1, wherein the first device and the second device are paired over a network.

8. The method according to claim 7, wherein the network is an WLAN, a high speed mobile network, the Internet, a Bluetooth network, or an NFC network.

9. The method according to claim 1, further comprising:
memorizing the metadata as a present metadata via a memory, whereby said memory enables scrolling through previous metadata that have already been memorized by the memory before the present metadata was memorized.

10. The method according to claim 1, wherein:
the metadata is retrieved by the first device while following an indication contained in a primary metadata;
said primary metadata comprises information to retrieve further metadata or extra contents; and
said primary metadata is stored in a memory on said first device, or is retrieved during a first usage of the first device.

11. An apparatus configured to perform the method according to claim 1.

12. A method for providing a main content and an extra content to a user, said method comprising:
receiving a specific main content and metadata from a first source and displaying said specific main content on a first device, wherein said metadata and said specific main content are broadcasted together from the first source, wherein said metadata links an extra content to said specific main content, and wherein said first source includes a television broadcasting source and said first device includes a television;
forwarding said metadata to a second device, wherein:
the forwarding of said metadata is executed by scanning said metadata by said second device,
the second device receives said extra content from a second source, and
said specific main content is displayed on said first device while said extra content is displayed on said second device;
wherein the extra content changes in correspondence to a change of the specific main content;
wherein the first source is different from the second source;
wherein the received specific main content and metadata originate from the first source;
wherein, when the extra content is selected, the extra content does not change even if the specific main content is changing, and any new extra content, which correlates to the changing specific main content, is delayed from being displayed on the second device until such time as a confirmation or input is received at the second device from the first device, and
wherein the confirmation or input is initially received at a command key of the first device, which is displaying the specific main content, such that the first device's command key, when selected, provides the confirmation or input and further causes the second device to display the new extra content.

13. A method for providing a main content and an extra content to a user, said method comprising:
receiving, by a first device, a specific main content and metadata from a first source and displaying said specific main content on the first device, wherein said metadata and said specific main content are broadcasted together from the first source, and wherein said metadata links an extra content to said specific main content;
forwarding said metadata to a second device, wherein:
the forwarding of said metadata is executed by scanning said metadata by said second device,
the second device receives said extra content from a second source, and
said specific main content is displayed on said first device while said extra content is displayed on said second device;
wherein the extra content changes in correspondence to a change of the specific main content;
wherein the first source is different from the second source;
wherein, when the extra content is selected, the extra content does not change even if the specific main content is changing, such that any new extra content generated while an initial extra content is displayed is stored in memory and is not presented until a confirmation or input is received to indicate that the new extra content is to be correlated with the changing specific main content; and
wherein the confirmation or input is initially received at a command key of the first device, which is displaying the specific main content, such that the first device's command key, when selected, provides the confirmation or input and further causes the second device to display the new extra content.

14. The method of claim 13, wherein the specific main content overlaps with the extra content at one or more different rates of transparency.

* * * * *